US007835942B1

(12) United States Patent
Pavlic et al.

(10) Patent No.: US 7,835,942 B1
(45) Date of Patent: Nov. 16, 2010

(54) SYSTEM FOR PAYMENT DATA EXCHANGE AND PAYMENT TERMINAL DEVICE USED THEREIN

(75) Inventors: Bogdan Pavlic, Zagorje (SI);
Aleksander Polutnik, Zagorje (SI)

(73) Assignee: Ultra Proizvodnja Elektronskih Naprav, Zagorje (SI)

( * ) Notice: Subject to any disclaimer, the term of this patent is extended or adjusted under 35 U.S.C. 154(b) by 2192 days.

(21) Appl. No.: 10/399,504

(22) PCT Filed: Oct. 18, 2000

(86) PCT No.: PCT/IB00/01495

§ 371 (c)(1),
(2), (4) Date: Sep. 8, 2003

(87) PCT Pub. No.: WO02/33669

PCT Pub. Date: Apr. 25, 2002

(51) Int. Cl.
*G06Q 20/00* (2006.01)
(52) U.S. Cl. .......................................... 705/16; 705/18
(58) Field of Classification Search .................. 705/16, 705/18; 235/472.02
See application file for complete search history.

(56) References Cited

U.S. PATENT DOCUMENTS

| | | | |
|---|---|---|---|
| 4,511,970 A | 4/1985 | Okano et al. | |
| 5,157,717 A | 10/1992 | Hitchcock | |
| 5,577,100 A * | 11/1996 | McGregor et al. | 455/406 |
| 5,714,741 A | 2/1998 | Pieterse et al. | |

FOREIGN PATENT DOCUMENTS

| | | |
|---|---|---|
| EP | 0745961 | 12/1996 |
| EP | 0848360 | 6/1998 |
| EP | 0940783 | 9/1999 |
| WO | 94/11849 | 5/1994 |

* cited by examiner

*Primary Examiner*—Ramsey Refai
(74) *Attorney, Agent, or Firm*—Antonelli, Terry, Stout & Kraus, LLP.

(57) ABSTRACT

Disclosed is a system for payment data exchange comprising a payment terminal device (10) for coupling to a point of sale device and to a mobile phone (14), an authorization center (1) for coupling to a mobile voice network (5) and to a financial information system, the mobile phone (14) for coupling to the mobile voice network (5) and to the payment terminal device (10). The payment data exchange is performed from the payment terminal device (10) via the mobile phone (14) and the mobile voice network (5) to the authorization center (1) and, vice versa, from the authorization center via the mobile voice network and the mobile phone to the payment terminal device, wherein the payment data are transferred between the payment terminal device (10) and the mobile phone (14) on voice information.

13 Claims, 2 Drawing Sheets

SYSTEM FOR PAYMENT DATA EXCHANGE AND PAYMENT TERMINAL DEVICE USED THEREIN

BACKGROUND OF THE INVENTION

1. Field of the Invention

The present invention relates to a system for financial transaction data (authentication, authorization and payment data) exchange between a point of sale device, e.g. vending machine etc. and an authorization center (an entity responsible for authentication, authorization and corresponding payment and settlement procedures of the transaction), and to a payment terminal device to be used in this system.

2. Description of the Prior Art

Mobile telephony is booming throughout the world and provides many recently developed applications in data communication. One of the hottest new services is payment through mobile phone which is generally called "m-commerce". There are available m-commerce solutions, most of them are based on WAP (Wireless Application Protocol) technology which promises to bring all the benefits of Internet to a mobile phone. Other solutions use calls to a special payment terminal, those calls being activated either from an authorization center or a subscriber or user. But there are severe obstacles preventing faster acceptance of m-commerce, especially in a non-internet domain, which are the costs of the known payment terminals with regard to their acquisition as well as operating costs. Among other things, this is due to the fact that each payment terminal has to include a fairly sophisticated communication interface which has to cover all the different, possible new and currently established standards of data communication in mobile telephone networks and phones.

SUMMARY OF THE INVENTION

The invention provides a system and a payment terminal to be used in this system which is able to prevent the problems and costs arising from the different mobile phone standards with regard to coupling a mobile phone to a payment terminal device.

Accordingly, the system of the invention for payment data exchange or communication has a payment terminal device for coupling to a point of sale device and to a mobile phone, an authorization center for coupling to a mobile voice network and to a financial information system, a mobile phone for coupling to the mobile voice network and to the payment terminal device, wherein payment data exchange is performed from the payment terminal device via the mobile phone, and the mobile voice network to the authorization center and, vice versa, from the authorization center via the mobile voice network and the mobile phone to the payment terminal device, wherein the payment data are transferred between the payment terminal device and the mobile phone using voice data information.

The great advantage of the present invention is the transfer of payment data between the mobile phone and the payment terminal device using voice data information which is the only standard to be taken into account by all phone makers and which, therefore, helps to reduce strongly the complexity of the communication interface in the payment terminal device and the costs connected thereto. Voice data information or voice information is the specific form of useful or wanted information which is known to be transferred and exchanged in the voice channel of the mobile voice network.

The payment terminal device of the invention for coupling to a point of sale device, vending machine etc. and to a mobile phone comprises interface means for releasable coupling the payment terminal device to the mobile phone.

The telephone connection is established by the user from the phone of the user, so the costs of the payment procedure or the telephone call are directed to the account of the user. Depending on the agreed relationship between the user, owner of the payment terminal device and the owner of the point of sale device, vending machine etc. the cost can be directed also to the account of another participating party. In any case the additional costs for establishing a telephone connection on the side of the operator are avoided.

The interface means of the payment terminal device comprises preferably coupling means for coupling to the mobile phone and a modem being coupled to the coupling means and to the processing means for converting voice data received from the authorization center by the mobile phone via the coupling means into data being sent to the processing means, and for converting data from the processing means into voice data prepared for coupling to the mobile phone via the coupling means. The data, encrypted or not, are thus transmitted through the mobile phone voice channel. The data modulation can either be DTMF or any other data modulation which can be transmitted through such a voice channel.

Preferably, the coupling means has an acoustic coupler for transferring voice data information in the form of acoustic signals to the mobile phone and vice versa, i.e. the voice data information is transferred as voice itself or voice as a carrier of information in the frequency band of human voice. Further, a distance between a microphone and a speaker of the acoustic coupler may be adjustable in order to adapt the acoustic coupler to different types of mobile phones. The acoustic coupler allows coupling of the payment terminal device to any type of mobile telephone which is currently used and which might be used in the future without any adaptation of the different mobile phones themselves. Generally, the shape of the acoustic coupler should enable the mobile phone microphone to fit with the speaker and vice versa in a way that allows operability even in a noisy condition or environment.

In preferred embodiments of the invention, there are several additional options for coupling of the payment terminal to the mobile phone.

In the first option being called the wired option, the coupling means has electrical plug connector means for electrical coupling to a plug connector of the mobile phone in order to exchange information or voice data information in the form of electrical signals between the mobile phone and the coupling means. The plug connector means can have a plurality of different plug connectors for coupling to plug connectors of different types of correspondingly different types of mobile phones.

The second option is IR communication (IR=infrared radiation or light) wherein the coupling means or interface means of the payment terminal comprises an IR interlace for communication with a corresponding IR interface of the mobile phone in order to exchange information or voice data information in the form of infrared signals between the payment terminal and the mobile phone. This is applicable on all newest mobile phone models which have, for instance, an IrDA interface. This option enables higher data rates and shorter transaction time.

The third option is RF communication (RF=radio frequency) wherein the coupling means or interface means of the payment terminal comprises a RF interface for communication with a corresponding RF interface of the mobile phone in order to exchange information or voice data information in the form of RF signals between the payment terminal and the mobile phone. BlueTooth, for instance, is a standard in this area, however other RF communication protocols are possible. The RF communication interface enables non contact transaction for highest user comfort.

In a preferred embodiment, the payment terminal device has data processing means which comprises at least a communication processor having cryptographic capability in order to generate data or to establish a data communication with high security due to secure coding of the data. The cryptographic capability may be of different types, such as DES, RSA, etc.

The payment terminal device of the invention can comprise data input means, such as at least one keyboard. The keyboard allows the user to select predefined services or to specify the amount for POS terminals.

The payment terminal device can comprise a printer or built-in printer in order, for instance, to print a confirmation of the actual payment procedure if the users want any.

The payment terminal device can have a display for showing the user, for instance, the different steps of the payment procedure or for giving him instructions on how to operate the payment terminal device.

Further, the payment terminal device can comprise additional communication means, for instance a PSTN modem, an ISDN modem, cable modem or a GSM modem for coupling to the related networks in order to provide maintenance services etc.

The payment terminal device can be equipped with an additional connection to another computer system, such as a POS computer system or a BOS computer system.

There are many applications which can be realized by means of the system or of the payment terminal device of the invention. The invention can be used, for instance, in vending machines for various products, such as beverages, food, cigarettes, magazines, condoms, etc. Further, public self-service stations as POS stations, such as gas stations, photocopiers, Internet access, car washes, laundries, jukeboxes, carpools, etc., can use the payment terminal device of the invention. Also, various ticket purchasing stations for bus, train, cinema etc. can use the invention. Payment authorization and execution for various shops (EFTPOS), Internet shopping, TV sales and other business, which use conventional billing methods for purchases, such as credit cards, bank cheques, cash, etc, can use the system or the payment terminal device of the invention.

BRIEF DESCRIPTION OF THE DRAWINGS

Further advantages, advantageous embodiments and additional applications of the invention are provided in the following description of a preferred embodiment of the invention in connection with the only figure being enclosed which shows.

Like reference numerals identify like parts.

DESCRIPTION OF THE PREFERRED EMBODIMENTS

Figure 1:
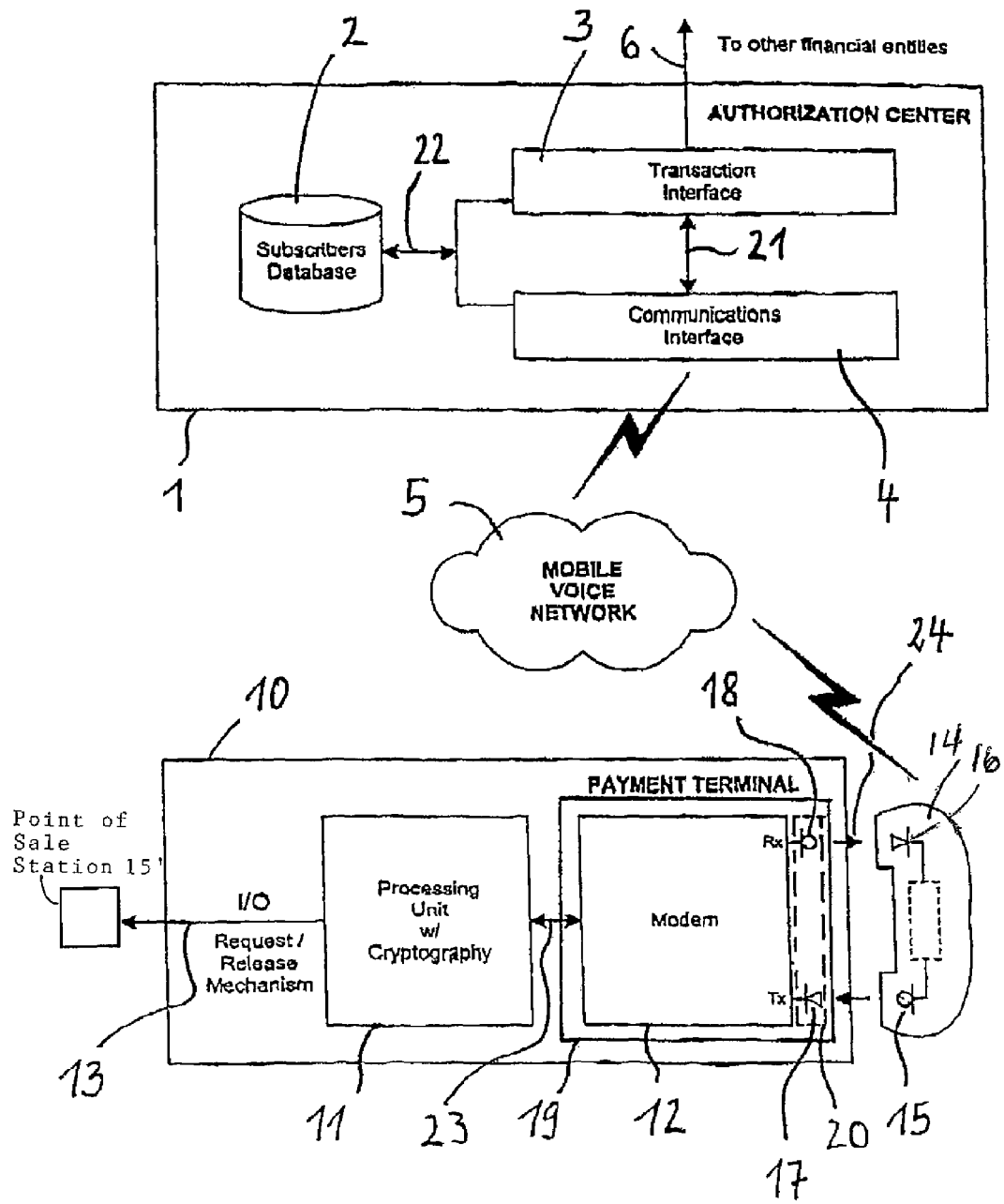
FIG. 1 is a schematic view of a system using a payment terminal device in accordance to a preferred embodiment of the invention.

FIG. 1 shows an embodiment of the inventive system that comprises an authorization center 1 that is similar to those used for credit card authorization and that may be connected by means of the data communication connection 6 to an other financial information system, such as a bank, a mobile voice network S or mobile telephone network, such as the GSM network, a mobile telephone 14 and a payment terminal device 10 to be coupled to the mobile telephone 14 of a user and to be connected via a data communication connection 13 to a point of sale station or means 15'. The terminal device 10 may perform a payment procedure with the point of sale station or means 15'.

The authorization center 1 comprises communication interface 4 for coupling the authorization center 1 to the mobile voice network 5, a subscribers database 2 that stores data relating to each of the users, for example at least the telephone number, a corresponding PIN code and the agreed method of payment, for example credit card, from bank account etc., assigned to each of the users, and optionally a comprehensive CRM, that is the complete information on customer's purchases and thus the possibility of personalized services, advertising, etc., and again optionally the user's secret code, and a transaction interlace 3 that is connected by means of the data communication connection 6 to an other financial information system. The transaction interface 3 is connected to the communication interface 4 by means of a bi-directional data connection 21. Further, the subscriber's database 2 is connected to the transaction interface 3 and to the communication interface 4 by means of a data communication line 22.

The payment terminal device 10 comprises data processing means 11, interface means 19 connected to the data processing means 11 by means of a bi-directional data communication line 23 or bus, for example a serial or a parallel data connection, and being coupled to the mobile telephone 14 using voice as a carrier of information 24. The data processing means is based on a microcomputer system or a communication processor and is additionally connected to POS means or a request/release mechanism or unit of a POS means or vending machine or similar apparatus by means of the data communication line or signal line 13.

The interface means 19 of the payment terminal device 10 comprises a modem 12 and coupling means 20 for coupling the modem 12 to the mobile phone 14. The coupling means 20 may use an acoustic coupling or an acoustic coupler using the loud speaker 18 and the microphone 17 in order to transfer or couple information using a voice as a carrier to a microphone 16 and a loudspeaker 15, respectively, of the mobile telephone 14 that is attached or mounted to the acoustic coupler of the coupling means 20.

To be able to use the system of the invention, the user has to own a mobile telephone 14 and the user has to set up a special account that belongs only to the user in the authorization center 1. The account set up is basically an agreement between the user and the authorization center 1, wherein both parties define the parameters of their co-operation. The parameters comprise one or more mobile phone numbers, for example SIM card numbers, the method of payment, for example money transfer, credit card, etc., optionally additional services which increase the security of both parties, for example transaction limits, security/authentication codes, etc., and optionally additional services which increase the flexibility of the user, for example multiple-accounts, etc. The user could change the parameters of the agreement which are stored in the subscribers database 2 of the authorization center 1 through user support services of the authorization center 1, through Internet services, WAP and similar services. The authorization center can on request of the user or within the framework of its business policy assign to each user special identification code which is used not to reveal the mobile telephone number of the user to other involved parties and to grant the protection of the privacy of the user when participating in the system of invention.

Next, a typical payment procedure is described if the inventive system of FIG. 1 is used.

In a first step, the user decides to make a purchase at a cashier or device 15' using the payment terminal device 10. The user uses his mobile phone 14 to call the authorization center 1 via the mobile voice network 5.

In a second step the authorization center 1 uses the caller identity to establish and decide whether the caller is a registered user of the system. If the verification is not successful the authorization center 1 terminates the connection to the user or mobile phone calling.

After the successful verification described in previous paragraph, the user is asked to input his security/authentication code, if the account parameters in the subscribers data base 2 require authentication of the user. The user inputs the code by means of a keypad of the mobile telephone 14. In the next step, the authorization center 1 checks and compares the security/authentication code received from the mobile telephone 14 via the mobile voice network 5 to a security/authentication code stored in the subscribers data base 2. If the authentication is not successful (that is the entered code does not correspond to the code in the database) the authorization center 1 terminates the connection. If the authentication is successful the authorization center 1 instructs the user to put his mobile telephone onto the acoustic coupler of the coupling means 20 of the payment terminal device 10. The payment terminal device shows the user information, for instance, on a display, on how to put the mobile telephone onto the acoustic coupler.

In the next step, the payment terminal device 10 and the authorization center 1 exchange the required transaction data or payment data via the voice channel established by the mobile telephone 14. The transaction data can be coded by means of cryptographic capability implemented in the processing means 11 on the side of the payment terminal device 10 and in the communications interface 4 in the authorization center 1. The processing means 11 controls the transaction data exchange on the side of the payment terminal device 10.

In the next step, the authorization center 1 verifies if the transaction data correspond to the specifications on the user's account (transaction limits . . . ) and approves or rejects the transaction. If the transaction was approved by the authorization center 1, the payment terminal device 10 sends a signal or data generated by the processing means 11 via the connection 13 to the release mechanism or POS terminal, vending machine, etc. 15' in order to release the paid goods or to approve a service being provided by these units or to display a visual approval if the sale is performed by a salesperson.

Figure 2:
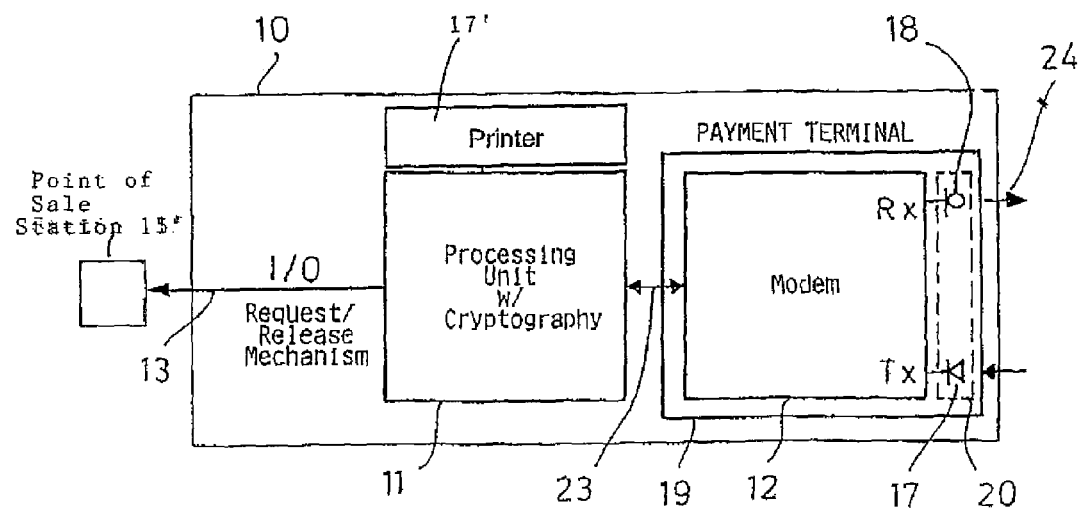
FIG. 2 is a schematic view of another embodiment of the invention including a printer for printing information related to a payment process performed with the payment terminal.

FIG. 2 illustrates a schematic view of another embodiment of the invention including a printer 17' for printing information related to a payment with the payment terminal 10. An authorization center 1 and mobile voice network 5 have been omitted for purposes of not complicating the illustration which are identical to their illustration thereof in FIG. 1.

Figure 3:
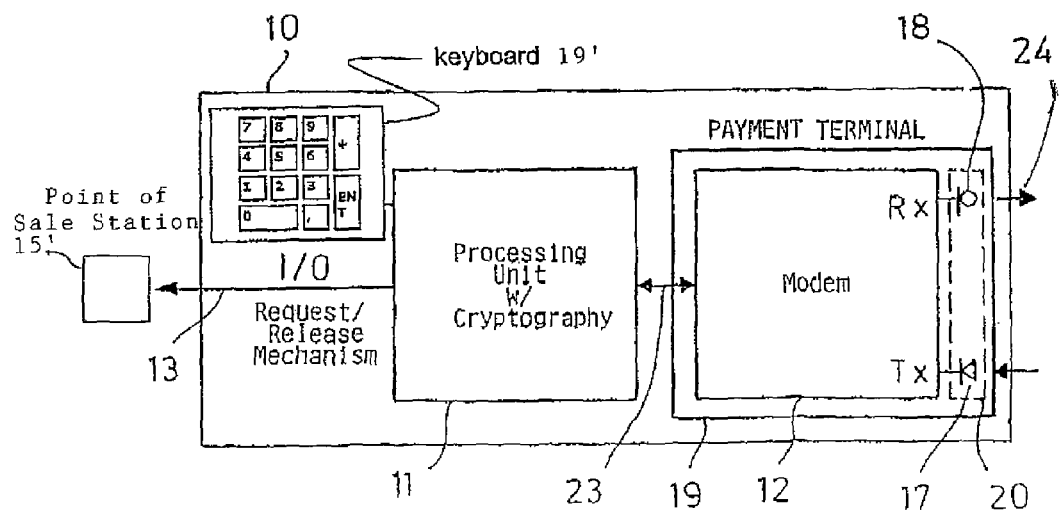
FIG. 3 is a schematic view of an additional embodiment of the invention including a keyboard for providing input data.

FIG. 3 illustrates a schematic view of an additional embodiment including a keyboard 19' which functions as a data input for inputting data related to a payment process performed with the payment terminal 10 and a point of sale station or means 15'. An authorization center 1 and the mobile voice network 5 have been omitted for purposes of not complicating the illustration which are identical to their illustration thereof in FIG. 1.

The invention claimed is:

1. A payment terminal device for use with a mobile phone and an authorization center to approve a transaction at a point of sale (POS) device, comprising:
   an interface for releasably coupling the payment terminal device to the mobile phone to exchange voice data between the payment terminal device and the authorization center via the mobile phone,
   wherein the payment terminal device comprises
   a data processor, coupled to the interface, for processing data received from the interface and for generating data for transmission to the interface,
   coupling means for coupling to the mobile phone and
   a modem coupled to the coupling means and to the data processor for converting the voice data received from the authorization center via the mobile phone and via the coupling means into voice data for transmission to the data processor and for converting data received from the data processor into voice data for transmission to the authorization center via the coupling means and via the mobile phone,
   wherein the coupling means includes an acoustic coupler for bidirectionally acoustically transmitting the voice data between the payment terminal and the mobile phone when the mobile phone is placed onto the acoustic coupler and
   wherein the payment terminal device outputs a signal to the POS device when the authorization center approves the transaction.

2. A payment terminal device according to claim 1, wherein the acoustic coupler has a microphone for coupling to a speaker of the mobile phone and a speaker for coupling to a microphone of the mobile phone.

3. A payment terminal device of claim 1, wherein a distance between the microphone and the coupler is adjustable for conforming the acoustic coupler to different types of mobile phones.

4. A payment terminal device according to claim 1, wherein, in addition to said acoustic coupler, the coupling means has a plug connector for coupling to a plug connector of the mobile phone in order to exchange voice data information in the form of electrical signals between the mobile phone and the coupling means.

5. A payment terminal device according to claim 1, wherein, in addition to the acoustic coupler, the coupling means has an IR interface for coupling to a corresponding IR interface of the mobile phone in order to exchange voice data in the form of infrared signals between the coupling means and the mobile phone.

6. A payment terminal device according to claim 1, wherein, in addition to said acoustic coupler, the coupling means has an RF interface for coupling to a corresponding RF interface of the mobile phone in order to exchange radio frequency signals containing the voice data between the coupling means and the mobile telephone.

7. A payment terminal device according to claim 4, wherein the plug connector has a plurality of different plug connectors for coupling to plug connectors of different types of mobile phones.

8. A payment terminal device according to claim 1, wherein the data processor comprises at least a communication processor having cryptographic capability.

9. A payment terminal device according to claim 1, wherein the payment terminal device comprises a data input for inputting data related to a payment process performed with the payment terminal device.

10. A payment terminal device according to claim 1, wherein the data input comprises at least one keyboard.

11. A payment terminal device according to claim 1, wherein the payment terminal device comprises a printer for printing information related to a payment process performed with the payment terminal device.

12. A payment terminal device according to claim 1, wherein the payment terminal device comprises a display for displaying information related to a payment process performed with the payment terminal device.

13. A method for performing a payment procedure comprising using a payment terminal according to claim 1 for performing the payment procedure.

* * * * *